United States Patent
Liu et al.

(10) Patent No.: US 9,162,894 B2
(45) Date of Patent: Oct. 20, 2015

(54) METHOD FOR PREPARING GRAPHENE

(75) Inventors: Zhaoping Liu, Zhejiang (CN); Xufeng Zhou, Zhejiang (CN); Zhihong Qin, Zhejiang (CN); Changlin Tang, Zhejiang (CN)

(73) Assignee: NINGBO INSTITUTE OF MATERIAL TECHNOLOGY AND ENGINEERING, CHINESE ACADEMY OF SCIENCES (CN)

( * ) Notice: Subject to any disclaimer, the term of this patent is extended or adjusted under 35 U.S.C. 154(b) by 0 days.

(21) Appl. No.: 13/577,027

(22) PCT Filed: Apr. 28, 2011

(86) PCT No.: PCT/CN2011/073458
§ 371 (c)(1),
(2), (4) Date: Aug. 3, 2012

(87) PCT Pub. No.: WO2012/145911
PCT Pub. Date: Nov. 1, 2012

(65) Prior Publication Data
US 2014/0037531 A1 Feb. 6, 2014

(51) Int. Cl.
*C01B 31/04* (2006.01)
*B82Y 40/00* (2011.01)
*B82Y 30/00* (2011.01)

(52) U.S. Cl.
CPC .......... *C01B 31/0446* (2013.01); *B82Y 30/00* (2013.01); *B82Y 40/00* (2013.01); *C01B 31/043* (2013.01); *Y10S 977/842* (2013.01)

(58) Field of Classification Search
CPC .................. C01B 31/0438; C01B 31/0446
USPC .................................. 423/460; 977/734–735
See application file for complete search history.

(56) References Cited

U.S. PATENT DOCUMENTS

| 2005/0271574 A1* | 12/2005 | Jang et al. ............... 423/448 |
| 2008/0258359 A1* | 10/2008 | Zhamu et al. ............ 264/673 |
| 2012/0128570 A1* | 5/2012 | Krishnaiah et al. ...... 423/415.1 |

FOREIGN PATENT DOCUMENTS

| CN | 101071860 A | 11/2007 |
| CN | 101613098 A | 12/2009 |

(Continued)

OTHER PUBLICATIONS

Zhong-Shuai Wu, Wencai Ren, Libo Gao, Bilu Liu, Chuanbin Jiang, Hui-Ming Cheng, Synthesis of high-quality graphene with a predetermined number layers, Carbon, vol. 47, Issue 2, Feb. 2009, pp. 493-499, ISSN 0008-6223, http://dx.doi.org/10.1016/j.carbon.2008.10.031. (http://www.sciencedirect.com/science/article/pii/S000862230800571X).*

(Continued)

*Primary Examiner* — Richard M Rump
(74) *Attorney, Agent, or Firm* — Cantor Colburn LLP

(57) ABSTRACT

The present invention provides a method for preparing graphene, including reacting graphite in an acid solution in which an oxidant is present so as to obtain a graphene. Compared with the prior art, the advantages of the present invention reside in that, the graphene prepared by the method of the present invention has excellent quality and substantially increased yield and production rate, as compared with mechanical stripping, epitaxial growth, and chemical vapor deposition; and the graphene prepared by the method of the present invention has significantly improved quality, substantially reduced structural defects, and significantly increased conductivity, as compared with oxidation-reduction preparation in the solution-phase; besides, the method is also advantageous for a simple process, mild conditions, low cost, and very easy for scale production. The graphene prepared by the present invention has very broad prospects in the fields of lithium-ion batteries, supercapacitors, functional composite materials, transparent conductive films, and microelectronic devices, etc.

9 Claims, 1 Drawing Sheet

(56) References Cited

FOREIGN PATENT DOCUMENTS

| CN | 101830458 A | 9/2010 |
| CN | 101966988 A | 2/2011 |
| CN | 102026916 A | 4/2011 |
| CN | 102306800 A | 1/2012 |
| WO | WO 2009123771 A2 * | 10/2009 |
| WO | WO 2010042912 A1 * | 4/2010 |

OTHER PUBLICATIONS

Claire Berger et al., "Electronic Confinement and Coherence in Patterned Epitaxial Graphene", Science Magazine, vol. 312, May 26, 2006, p. 1191-1196.

K.S. Novoselov et al., "Electric Field Effect in Atomically Thin Carbon Films", Science vol. 306, Oct. 22, 2004, p. 666-669.

Keun Soo Kim et al., "Large-Scale Pattern Growth of Graphene Films for Stretchable Transparent Electrodes", Nature, vol. 457, Feb. 5, 2009, p. 706-710.

Sungjin Park et al., "Chemical methods for the production of graphenes", Nature Nanotechnology, published online; Mar. 29, 2009, vol. 4 p. 217-225.

Seo-Yoon Bae et al., "Large-Area Graphene Films by Simple Solution Casting of Edge-Selectively Functionalized Graphite", American Chemical Society, vol. 5, No. 6, 4974-4980; Published Online: May 17, 2011; 7 pages.

* cited by examiner

METHOD FOR PREPARING GRAPHENE

CROSS REFERENCE TO RELATED APPLICATIONS

This is a U.S. national stage of application No. PCT/CN2011/073458, filed on 28 Apr. 2011.

FIELD OF THE INVENTION

The present invention relates to a field of nano-material technology, in particular relates to a method for preparing graphene.

BACKGROUND ART

Since discovered in 2004, as a new carbon material, graphene has immediately excited great interest among scientists. Graphene having a unique two-dimensional nano-structure is high in electron transport rate, conductivity, and thermal conductivity. Besides, graphene is a material of the highest mechanical strength ever known, which is also advantageous in stable chemical properties and good light transmittance. Graphene provides a very attractive prospect in many fields such as the semiconductor industry, energy storage materials, functional composite materials, sensors and bio-pharmaceutical fields. Thus, fundamental and application studies on graphene have become a focus among international researches.

The preparation method for graphene is the key issue as to whether the material can achieve practical applications. As research continues, many fields, including energy storage materials and functional composite materials, have proposed stricter requirements on the quality and production scale of graphene. Methods for preparing graphene reported in the prior art include mechanical stripping (K. S. Novoselov, A. K. Geim, S. V. Morozov, D. Jiang, Y. Zhang, S. V. Dubonos, I. V. Grigorieva, A. A. Firsov, Science 2004, 306, 666), epitaxial growth (C. Berger, Z. M. Song, X. B. Li, X. S. Wu, N. Brown, C. Naud, D. Mayou, T. B. Li, J. Hass, A. N. Marchenkov, E. H. Conrad, P. N. First, W. A. de Heer, Science 2006, 312, 1191), chemical vapor deposition (K. S. Kim, Y. Zhao, H. Jang, S. Y. Lee, J. M. Kim, K. S. Kim, J.-H. Ahn, P. Kim, J.-Y. Choi, B. H. Hong, Nature 2009, 457, 706), and oxidation-reduction preparation in the solution-phase (S. J. Park, R. S. Ruoff, Nature Nanotechnology 2009, 4, 217)

Among the above methods, mechanical stripping and epitaxial growth are low in production efficiency, and thus have difficulties in meeting the large-scale needs. Chemical vapor deposition may produce a successive graphene film having a large size; however, the graphene film produced is merely applicable to micro-nano electronic devices or transparent conductive film, but can not meet the large-scale needs in the fields of energy storage materials and functional composite materials.

Compared with the above three methods, the oxidation-reduction preparation in the solution-phase has significantly improved scale of production, but the fierce redox condition in the oxidation-reduction preparation in the solution-phase disclosed in the prior art results in many defects in the graphene product, and significantly deteriorates the quality and performance such as conductivity of graphene. Moreover, the conventional oxidation-reduction preparation in the solution-phase is complicated in process and has considerable difficulties in handling of the reaction waste liquid. In summary, none of the methods in the prior art is suitable for large-scale preparation of high-quality graphene.

SUMMARY OF THE INVENTION

The problem to be solved by this invention is to provide a method for preparing graphene, as compared with the prior art, the present method has a simple preparation process and mild reaction conditions. The oxidation condition employed by the present method is weaker than that in a conventional oxidation-reduction preparation in the solution-phase, and the graphene is prepared under low degree of oxidation and without the need for a reduction step, and the graphene obtained has less structural defects and excellent conductivity.

In order to solve the above technical problem, the present invention provides a method for preparing the graphene, including:

reacting graphite in an acid solution in which an oxidant is present so as to obtain a graphene.

Preferably, the product upon reaction has a ratio of carbon to oxygen atoms of greater than 5.

Preferably, the oxidant includes one or more selected from the group consisting of nitric acid, sulfuric acid, perchloric acid, hypochlorous acid, nitrous acid, chlorosulfonic acid, dichromates, perchlorates, chlorates, hypochlorites, persulfates, hydrogen peroxide, and peroxides.

Preferably, the acid in the acid solution is one or more selected from the group consisting of nitric acid, sulfuric acid, hydrochloric acid, perchloric acid, hypochlorous acid, nitrous acid, chlorosulfonic acid, acetic acid, and oxalic acid.

Preferably, the solvent in the acid solution includes one or more selected from the group consisting of ethanol, carbon tetrachloride, benzene, water, methanol, acetone, formaldehyde, acetaldehyde, and acetic acid.

Preferably, the graphite includes one or more selected the group consisting of natural graphite, artificial graphite, and expandable graphite.

Preferably, the ratio of graphite:oxidant:acid:solvent is 1:0.1-50:0.1-50:0.1-100 by mass.

Preferably, the reaction is carried out at a temperature of 0-90° C.

Preferably, the reaction is carried out for 1 minute to 10 hours. Preferably, the method further includes a step of washing the reaction mixture to neutral.

Preferably, the method further includes a step of stripping the graphene obtained by the reaction.

Preferably, the stripping includes one or more of high temperature stripping, mechanical grinding or ultrasonic treatment.

The present invention provides a method for preparing graphene, including reacting graphite in an acid solution in which an oxidant is present so as to obtain a graphene. Compared with the prior art, the advantages of the present invention reside in that, the graphene prepared by the method of the present invention has excellent quality and substantial increased throughout and yield, as compared with mechanical stripping, epitaxial growth, and chemical vapor deposition; and the graphene prepared by the method of the present invention has significantly improved quality, substantially reduced structural defects, and significantly increased conductivity, as compared with oxidation-reduction preparation in the solution-phase; besides, the method is also advantageous for a simple process, mild conditions, low cost, and very easy for scale production. The graphene prepared by the present invention has very broad prospects in the fields of lithium-ion batteries, supercapacitors, functional composite materials, transparent conductive films, and microelectronic devices, etc.

MODES FOR CARRYING OUT THE PRESENT INVENTION

Figure 1:
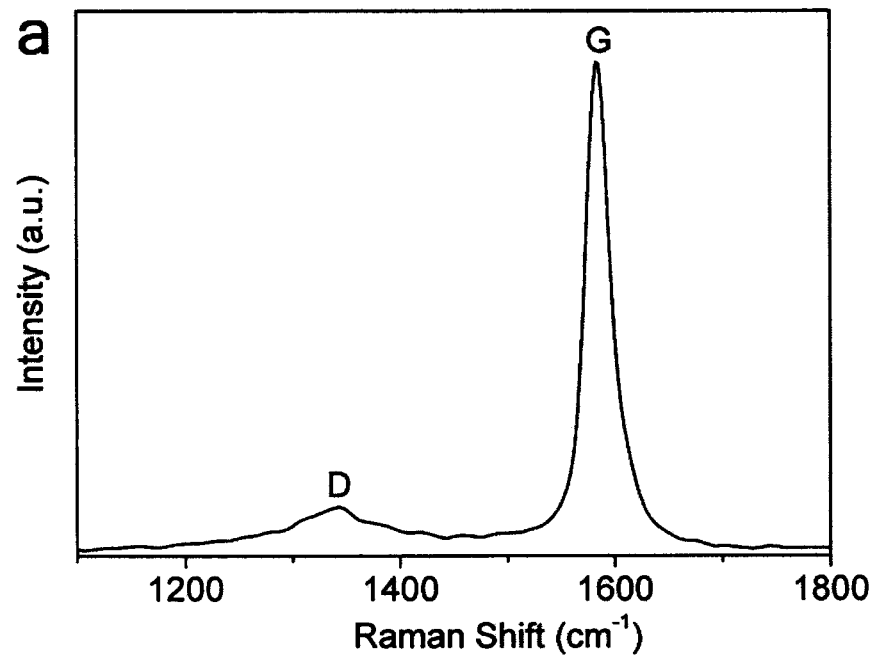
FIG. 1 shows the Raman spectrum of graphene prepared in Example 1 of the present invention.

Preferred embodiments of the present invention are described by way of examples, such that those of ordinary skill in the art have a better understanding of the present invention. However, it is to be understood that, the detailed description is provided for further illustrating the features and advantages of the present invention but should not be construed as limitations to the claims of the present invention.

The present invention provides a method for preparing the graphene, including:
reacting graphite in an acid solution in which an oxidant is present so as to obtain a graphene.

According to the present invention, the product upon the reaction has a ratio of carbon to oxygen atoms of greater than 5, more preferably greater than 10, still more preferably greater than 14, even preferably greater than 16, still even more preferably greater than 20.

According to the present invention, the acid in the acid solution may be, but not limited to, one or more selected from the group consisting of nitric acid, sulfuric acid, perchloric acid, hypochlorous acid, nitrous acid, chlorosulfonic acid, acetic acid, and oxalic acid. The oxidant may be, but not limited to, one or more selected from the group consisting of nitric acid, sulfuric acid, perchloric acid, hypochlorous acid, nitrous acid, chlorosulfonic acid, dichromates, perchlorates, chlorates, hypochlorites, persulfates, hydrogen peroxide, and peroxides. The solvent in the acid solution may be, but not limited to, one or more selected from the group consisting of ethanol, carbon tetrachloride, benzene, water, methanol, acetone, formaldehyde, acetaldehyde, and acetic acid. Specific examples of the dichromates include, but not limited to, sodium dichromate, potassium dichromate, and ammonium dichromate. Specific examples of the perchlorates include, but not limited to, potassium perchlorate, sodium perchlorate, ammonium perchlorate, and calcium perchlorate. Specific examples of the chlorates include, but not limited to, potassium chlorate, sodium chlorate, and ammonium chlorate. Specific examples of the hypochlorites include, but not limited to, potassium hypochlorite, sodium hypochlorite, and ammonium hypochlorite. Specific examples of the persulfates include, but not limited to, potassium persulfate, sodium persulfate, and ammonium persulfate. Specific examples of the peroxides include, but not limited to, sodium peroxide, potassium peroxide, and peracetic acid.

According to the present invention, the ratio of graphite: oxidant:acid:solvent is 1:0.1-50:0.1-50:0.1-100 by mass, more preferably 1:0.2-40:1-40:0.2-50, still more preferably 1:0.2-20:0.5-20:0.2-20; the reaction is carried out at a temperature of 0-90° C., more preferably 10-80° C., still more preferably 20-70° C.; the reaction is carried out for 1 minute to 10 hours, more preferably 10 minutes to 9 hours, still more preferably 30 minutes to 5 hours.

According to the present invention, the method further includes a step of washing the reaction mixture to neutral posterior to the reaction. Preferably, the method further includes a step of stripping the graphene obtained by the reaction, and the stripping includes one or more of high temperature stripping, mechanical grinding or ultrasonic treatment. In case the stripping includes a combination of any of high temperature stripping, mechanical grinding and ultrasonic treatment, the order is not particularly limited.

According to the present invention, the high temperature stripping is preferably carried out according to the following steps:

The product is heated to a temperature of 500-1000° C., preferably 650-950° C., more preferably 700-800° C., even more preferably 750-800° C., and maintained at the same temperature for at least 10 seconds, more preferably 10 seconds to 5 minutes, even more preferably 50 seconds to 3 minutes.

According to the present invention, in case of stripping by mechanical grinding, one or more of high-energy ball milling, ball mediated sand milling, oscillation grinding, and impact grinding can be used, and the grinding is preferably carried out for at least 10 minutes, more preferably at least 15 minutes, still more preferably at least 20 minutes, even more preferably 30 minutes to 20 hours, even still more preferably 2 hours to 15 hours, further preferably 10 hours to 14 hours.

According to the present invention, in case of stripping by ultrasound, the ultrasonic treatment is preferably carried out for 1 minute to 10 hours, more preferably 10 minutes to 8 hours, still more preferably 10 minutes to 8 hours, even more preferably 20 minutes to 6 hours, even still more preferably 40 minutes to 4 hours.

In case of ultrasonic treatment for the product, solvent such as N-methyl pyrrolidone, N,N-dimethylformamide, N,N-dimethyl acetamide, N-methyl formamide, dimethyl sulfoxide, benzene, toluene, xylene, carbon tetrachloride, dichloromethane, chloroform, acetonitrile, acrylonitrile, methylene chloride, chlorosulfonic acid, ethanol, ethylene glycol, glycerol, isopropyl alcohol, acetone or water, or the combination thereof can be used.

Compared with the prior art, the advantages of the present invention reside in that, the graphene prepared by the method of the present invention has excellent quality and substantial increased throughout and yield, as compared with mechanical stripping, epitaxial growth, and chemical vapor deposition; and the graphene prepared by the method of the present invention has significantly improved quality, substantially reduced structural defects, and significantly increased conductivity, as compared with oxidation-reduction preparation in the solution-phase; besides, the method is also advantageous for a simple process, mild conditions, low cost, and very easy for scale production. The graphene prepared by the present invention has very broad prospects in the fields of lithium-ion batteries, supercapacitors, functional composite materials, transparent conductive films, and microelectronic devices, etc.

The following specific examples are used to illustrate the effect of the present invention, but not to limit the scope of protection of the present invention.

Example 1

First, potassium dichromate was mixed with 69 wt % aqueous solution of nitric acid, and graphite was added thereto, the ratio of graphite:nitric acid:potassium dichromate:water being 1:20:10:9 by weight. Upon reaction at 40° C. for 1 hour, the product was washed with water to neutral and dried;

Secondly, the product obtained in the first step was maintained at 900° C. for 1 minute, then cooled to room temperature;

Thirdly, the product obtained in the second step was ground in a high-energy ball mill or a sand mill for 5 hours;

Fourthly, the product obtained in the third step was dispersed in ethanol and subjected to ultrasonic treatment for 1 hour. Graphene was obtained with a yield of 96%, and the product has a ratio of carbon to oxygen atoms of 21.2.

Example 2

First, potassium dichromate was mixed with 69 wt % aqueous solution of nitric acid and a certain amount of ethanol, and graphite was added thereto, the ratio of graphite:concentrated nitric acid:potassium dichromate:water:ethanol being 1:20:10:9:10 by weight. Upon reaction at 40° C. for 1 hour, the product was washed with water to neutral and dried;

Secondly, the product obtained in the first step was maintained at 900° C. for 1 minute, then cooled to room temperature;

Thirdly, the product obtained in the second step was ground in a high-energy ball mill or a sand mill for 5 hours;

Fourthly, the product obtained in the third step was dispersed in ethanol and subjected to ultrasonic treatment for 1 hour. Graphene was obtained.

Example 3

First, potassium dichromate was mixed with 69 wt % aqueous solution of nitric acid and a certain amount of methanol, and graphite was added thereto, the ratio of graphite:concentrated nitric acid:potassium dichromate:water:methanol being 1:20:10:9:10 by weight. Upon reaction at 40° C. for 1 hour, the product was washed with water to neutral and dried;

Secondly, the product obtained in the first step was maintained at 700° C. for 1 minute, then cooled to room temperature;

Thirdly, the product obtained in the second step was ground in a high-energy ball mill or a sand mill for 5 hours;

Fourthly, the product obtained in the third step was dispersed in ethanol and subjected to ultrasonic treatment for 1 hour. Graphene was obtained.

Example 4

First, potassium dichromate was mixed with 69 wt % aqueous solution of nitric acid and a certain amount of acetic acid, and graphite was added thereto, the ratio of graphite:concentrated nitric acid:potassium dichromate:water:acetic acid being 1:20:10:9:20 by weight. Upon reaction at 40° C. for 1 hour, the product was washed with water to neutral and dried;

Secondly, the product obtained in the first step was maintained at 700° C. for 1 minute, then cooled to room temperature;

Thirdly, the product obtained in the second step was ground in a high-energy ball mill or a sand mill for 5 hours;

Fourthly, the product obtained in the third step was dispersed in ethanol and subjected to ultrasonic treatment for 1 hour. Graphene was obtained.

Example 5

First, sodium dichromate was mixed with 98 wt % concentrated sulfuric acid, and graphite was added thereto, the ratio of graphite:concentrated sulfuric acid:sodium dichromate being 1:40:20 by weight. Upon reaction at 80° C. for 1 hour, the product was washed with water to neutral and dried;

Secondly, the product obtained in the first step was maintained at 1000° C. for 1 minute, then cooled to room temperature;

Thirdly, the product obtained in the second step was ground in a high-energy ball mill or a sand mill for 10 hours;

Fourthly, the product obtained in the third step was dispersed in ethanol and subjected to ultrasonic treatment for 5 hours. Graphene was obtained.

Example 6

First, potassium perchlorate was mixed with 96 wt % concentrated sulfuric acid, and graphite was added thereto, the ratio of graphite:concentrated sulfuric acid:potassium perchlorate being 1:10:10 by weight. Upon reaction at 50° C. for 1 hour, the product was washed with water to neutral and dried;

Secondly, the product obtained in the first step was maintained at 600° C. for 30 seconds, then cooled to room temperature;

Thirdly, the product obtained in the second step was ground in a high-energy ball mill or a sand mill for 1 hour;

Fourthly, the product obtained in the third step was dispersed in ethanol and subjected to ultrasonic treatment for 1 hour. Graphene was obtained.

Example 7

First, ammonium perchlorate was mixed with 96 wt % concentrated sulfuric acid, and graphite was added thereto, the ratio of graphite:concentrated sulfuric acid:ammonium perchlorate being 1:5:0.5 by weight. Upon reaction at 20° C. for 2 hours, the product was washed with water to neutral and dried;

Secondly, the product obtained in the first step was maintained at 800° C. for 30 seconds, then cooled to room temperature;

Thirdly, the product obtained in the second step was ground in a high-energy ball mill or a sand mill for 1 hour;

Fourthly, the product obtained in the third step was dispersed in N-methyl pyrrolidone and subjected to ultrasonic treatment for 1 hour. Graphene was obtained.

Example 8

First, potassium chlorate was mixed with 96 wt % concentrated sulfuric acid, and graphite was added thereto, the ratio of graphite:concentrated sulfuric acid:potassium chlorate being 1:1:0.5 by weight. Upon reaction at 40° C. for 0.5 hour, the product was washed with water to neutral and dried;

Secondly, the product obtained in the first step was maintained at 800° C. for 30 seconds, then cooled to room temperature;

Thirdly, the product obtained in the second step was ground in a high-energy ball mill or a sand mill for 1 hour;

Fourthly, the product obtained in the third step was dispersed in N-methyl pyrrolidone and subjected to ultrasonic treatment for 1 hour. Graphene was obtained.

Example 9

First, potassium chlorate was mixed with 96 wt % concentrated sulfuric acid and 69 wt % aqueous solution of nitric acid, and graphite was added thereto, the ratio of graphite: concentrated sulfuric acid:concentrated nitric acid:potassium chlorate:water being 1:1:0.5:1:0.22 by weight. Upon reaction at 60° C. for 1 hour, the product was washed with water to neutral and dried;

Secondly, the product obtained in the first step was maintained at 800° C. for 1 minute, then cooled to room temperature;

Thirdly, the product obtained in the second step was ground in a high-energy ball mill or a sand mill for 1 hour;

Fourthly, the product obtained in the third step was dispersed in N,N-dimethyl acetamide and subjected to ultrasonic treatment for 1 hour. Graphene was obtained.

Example 10

First, sodium chlorate was mixed with 69 wt % aqueous solution of nitric acid, and graphite was added thereto, the ratio of graphite:nitric acid:sodium chlorate:water being 1:2:2:0.9 by weight. Upon reaction at 60° C. for 1 hour, the product was washed with water to neutral and dried;

Secondly, the product obtained in the first step was maintained at 700° C. for 1 minute, then cooled to room temperature;

Thirdly, the product obtained in the second step was ground in a high-energy ball mill or a sand mill for 5 hours;

Fourthly, the product obtained in the third step was dispersed in N,N-dimethyl acetamide and subjected to ultrasonic treatment for 1 hour. Graphene was obtained.

Example 11

First, potassium chlorate was mixed with 69 wt % aqueous solution of nitric acid, and graphite was added thereto, the ratio of graphite:concentrated nitric acid:potassium chlorate:water being 1:10:20:5.4 by weight. Upon reaction at 70° C. for 1 hour, the product was washed with water to neutral and dried;

Secondly, the product obtained in the first step was maintained at 700° C. for 1 minute, then cooled to room temperature;

Thirdly, the product obtained in the second step was dispersed in N-methyl pyrrolidone and subjected to ultrasonic treatment for 1 hour. Graphene was obtained.

Example 12

First, potassium chlorate was mixed with a certain amount of 69 wt % aqueous solution of nitric acid, and graphite was added thereto, the ratio of graphite:concentrated nitric acid:potassium chlorate:water being 1:10:20:4.5 by weight. Upon reaction at 70° C. for 1 hour, the product was washed with water to neutral and dried;

Secondly, the product obtained in the first step was maintained at 700° C. for 1 minute, then cooled to room temperature;

Thirdly, the product obtained in the second step was dispersed in N-methyl pyrrolidone and subjected to ultrasonic treatment for 1 hour. Graphene was obtained.

Example 13

First, potassium dichromate was mixed with 69 wt % aqueous solution of nitric acid, and graphite was added thereto, the ratio of graphite:concentrated nitric acid:potassium dichromate:water being 1:20:20:9 by weight. Upon reaction at 70° C. for 1 hour, the product was washed with water to neutral and dried;

Secondly, the product obtained in the first step was maintained at 700° C. for 1 minute, then cooled to room temperature;

Thirdly, the product obtained in the second step was dispersed in ethanol and subjected to ultrasonic treatment for 1 hour. Graphene was obtained.

Example 14

First, potassium dichromate was mixed with 96 wt % concentrated sulfuric acid, and graphite was added thereto, the ratio of graphite:concentrated sulfuric acid:potassium dichromate being 1:10:20 by weight. Upon reaction at 80° C. for 1 hour, the product was washed with water to neutral and dried;

Secondly, the product obtained in the first step was ground in a high-energy ball mill for 2 hours;

Thirdly, the product obtained in the second step was dispersed in N-methyl pyrrolidone and subjected to ultrasonic treatment for 1 hour. Graphene was obtained.

Example 15

First, potassium dichromate was mixed with 96 wt % concentrated sulfuric acid and acetic acid, and graphite was added thereto, the ratio of graphite:concentrated sulfuric acid:potassium dichromate:acetic acid being 1:10:20:5 by weight. Upon reaction at 80° C. for 1 hour, the product was washed with water to neutral and dried;

Secondly, the product obtained in the first step was ground in a high-energy ball mill for 2 hours;

Thirdly, the product obtained in the second step was dispersed in N-methyl pyrrolidone and subjected to ultrasonic treatment for 1 hour. Graphene was obtained.

Example 16

First, potassium dichromate was mixed with 98 wt % concentrated sulfuric acid, and graphite was added thereto, the ratio of graphite:concentrated sulfuric acid:potassium dichromate being 1:20:10 by weight. Upon reaction at 70° C. for 1 hour, the product was washed with water to neutral and dried;

Secondly, the product obtained in the first step was maintained at 1000° C. for 2 minutes, then cooled to room temperature;

Thirdly, the product obtained in the second step was ground in a high-energy ball mill for 1 hour. Graphene was thus obtained.

Example 17

First, potassium dichromate was mixed with 96 wt % concentrated sulfuric acid, and graphite was added thereto, the ratio of graphite:concentrated sulfuric acid:potassium dichromate being 1:20:10 by weight. Upon reaction at 70° C. for 1 hour, the product was washed with water to neutral and dried;

Secondly, the product obtained in the first step was ground in a high-energy ball mill for 1 hour. Graphene was thus obtained.

Example 18

First, potassium dichromate was mixed with 96 wt % concentrated sulfuric acid, and graphite was added thereto, the ratio of graphite:concentrated sulfuric acid:potassium dichromate being 1:20:10 by weight. Upon reaction at 70° C. for 1 hour, the product was washed with water to neutral and dried;

Secondly, the product obtained in the first step was dispersed in N-methyl pyrrolidone and subjected to ultrasonic treatment for 1 minute. Graphene was obtained.

Example 19

First, potassium persulfate was mixed with 96 wt % concentrated sulfuric acid, and graphite was added thereto, the ratio of graphite:concentrated sulfuric acid:potassium persulfate being 1:30:20 by weight. Upon reaction at 40° C. for 1 hour, the product was washed with water to neutral and dried;

Secondly, the product obtained in the first step was maintained at 800° C. for 30 seconds, then cooled to room temperature;

Thirdly, the product obtained in the second step was dispersed in ethanol and subjected to ultrasonic treatment for 1 hour. Graphene was obtained.

Example 20

First, sodium persulfate was mixed with 96 wt % concentrated sulfuric acid, and graphite was added thereto, the ratio of graphite:concentrated sulfuric acid:sodium persulfate being 1:20:10 by weight. Upon reaction at 70° C. for 1 hour, the product was washed with water to neutral and dried;

Secondly, the product obtained in the first step was dispersed in ethanol and subjected to ultrasonic treatment for 1 hour. Graphene was obtained.

Example 21

First, ammonium persulfate was mixed with 96 wt % concentrated sulfuric acid, and graphite was added thereto, the ratio of graphite:concentrated sulfuric acid:ammonium persulfate being 1:30:15 by weight. Upon reaction at 40° C. for 1 hour, the product was washed with water to neutral and dried;

Secondly, the product obtained in the first step was dispersed in ethanol and subjected to ultrasonic treatment for 1 hour. Graphene was obtained.

Example 22

First, potassium persulfate was mixed with 96 wt % concentrated sulfuric acid, and graphite was added thereto, the ratio of graphite:concentrated sulfuric acid:potassium persulfate being 1:30:15 by weight. Upon reaction at 40° C. for 1 hour, the product was washed with water to neutral and dried;

Secondly, the product obtained in the first step was dispersed in N-methyl pyrrolidone and subjected to ultrasonic treatment for 1 hour. Graphene was obtained.

Example 23

First, sodium persulfate was mixed with 96 wt % concentrated sulfuric acid, and graphite was added thereto, the ratio of graphite:concentrated sulfuric acid:sodium persulfate being 1:5:5 by weight. Upon reaction at 40° C. for 1 hour, the product was washed with water to neutral and dried;

Secondly, the product obtained in the first step was dispersed in a mixture solvent of water and ethanol and subjected to ultrasonic treatment for 1 hour. Graphene was obtained.

Example 24

First, sodium persulfate was mixed with 69 wt % aqueous solution of nitric acid and acetic acid, and graphite was added thereto, the ratio of graphite:nitric acid:sodium persulfate:water:acetic acid being 1:20:20:9:10 by weight. Upon reaction at 40° C. for 1 hour, the product was washed with water to neutral and dried;

Secondly, the product obtained in the first step was dispersed in ethanol and subjected to ultrasonic treatment for 1 hour. Graphene was obtained.

Example 25

First, 30 wt % aqueous hydrogen peroxide was mixed with 96 wt % concentrated sulfuric acid, and graphite was added thereto, the ratio of graphite:concentrated sulfuric acid:hydrogen peroxide:water being 1:20:3:7 by weight. Upon reaction at 75° C. for 0.5 hour, the product was washed with water to neutral and dried;

Secondly, the product obtained in the first step was maintained at 800° C. for 1 minute, then cooled to room temperature;

Thirdly, the product obtained in the second step was dispersed in N-methyl pyrrolidone and subjected to ultrasonic treatment for 1 hour. Graphene was obtained.

Example 26

First, 30 wt % aqueous hydrogen peroxide was mixed with 65 wt % nitric acid, and graphite was added thereto, the ratio of graphite:nitric acid:hydrogen peroxide:water being 1:15:3:15 by weight. Upon reaction at 75° C. for 0.2 hour, the mixture was stand for another 5 hours, and the product was washed with water to neutral and dried;

Secondly, the product obtained in the first step was maintained at 850° C. for 1 minute, then cooled to room temperature;

Thirdly, the product obtained in the second step was dispersed in DMSO and subjected to ultrasonic treatment for 1 hour. Graphene was obtained.

Example 27

First, sodium peroxide was mixed with 65 wt % nitric acid, and graphite was added thereto, the ratio of graphite:nitric acid:sodium peroxide:water being 1:20:10:9 by weight. Upon reaction at 75° C. for 0.2 hour, the product was washed with water to neutral and dried;

Secondly, the product obtained in the first step was maintained at 850° C. for 1 minute, then cooled to room temperature;

Thirdly, the product obtained in the second step was dispersed in chloroform and subjected to ultrasonic treatment for 1 hour. Graphene was obtained.

Example 28

First, potassium peroxide was mixed with 65 wt % nitric acid, and graphite was added thereto, the ratio of graphite:nitric acid:potassium peroxide:water being 1:10:20:4.5 by weight. Upon reaction at 75° C. for 0.2 hour, the product was washed with water to neutral and dried;

Secondly, the product obtained in the first step was maintained at 850° C. for 1 minute, then cooled to room temperature;

Thirdly, the product obtained in the second step was ground in a high-energy ball mill for 1 hour. Graphene was thus obtained.

Example 29

First, peracetic acid was mixed with 65 wt % nitric acid, and graphite was added thereto, the ratio of graphite:nitric acid:peracetic acid:water being 1:20:10:9 by weight. Upon reaction at 75° C. for 1.5 hours, the product was washed with water to neutral and dried;

Secondly, the product obtained in the first step was maintained at 850° C. for 1 minute, then cooled to room temperature;

Thirdly, the product obtained in the second step was dispersed in isopropanol and subjected to ultrasonic treatment for 1 hour. Graphene was obtained.

Example 30

First, potassium dichromate was mixed with 70 wt % aqueous solution of perchloric acid, and graphite was added thereto, the ratio of graphite:perchloric acid:potassium dichromate:water being 1:30:20:12.9 by weight. Upon reaction at 75° C. for 1.5 hours, the product was washed with water to neutral and dried;

Secondly, the product obtained in the first step was maintained at 850° C. for 1 minute, then cooled to room temperature;

Thirdly, the product obtained in the second step was ground in a high-energy ball mill for 3 hours;

Fourthly, the product obtained in the third step was dispersed in ethanol and subjected to ultrasonic treatment for 2 hours. Graphene was thus obtained.

Example 31

First, potassium persulfate was mixed with 70 wt % aqueous solution of perchloric acid, and graphite was added thereto, the ratio of graphite:perchloric acid:potassium persulfate:water being 1:25:15:10.7 by weight. Upon reaction at 75° C. for 1.5 hours, the product was washed with water to neutral and dried;

Secondly, the product obtained in the first step was maintained at 850° C. for 1 minute, then cooled to room temperature;

Thirdly, the product obtained in the second step was ground in a high-energy ball mill for 2 hours;

Fourthly, the product obtained in the third step was dispersed in N-methyl pyrrolidone and subjected to ultrasonic treatment for 2 hours. Graphene was thus obtained.

Example 32

First, potassium chlorate was mixed with chlorosulfonic acid, and graphite was added thereto, the ratio of graphite:potassium chlorate:chlorosulfonic acid being 1:30:18 by weight. Upon reaction at 80° C. for 2 hours, the product was washed with water to neutral and dried;

Secondly, the product obtained in the first step was maintained at 1000° C. for 1 minute, then cooled to room temperature;

Thirdly, the product obtained in the second step was dispersed in N-methyl formamide and subjected to ultrasonic treatment for 2 hours. Graphene was thus obtained.

Example 33

First, potassium dichromate was mixed with 96 wt % concentrated sulfuric acid, and graphite was added thereto, the ratio of graphite:concentrated sulfuric acid:potassium dichromate being 1:33:20 by weight. Upon reaction at 80° C. for 2 hours, the product was washed with water to neutral and dried;

Secondly, the product obtained in the first step was maintained at 1000° C. for 1 minute, then cooled to room temperature;

Thirdly, the product obtained in the second step was ground in a high-energy ball mill for 1 hour;

Fourthly, the product obtained in the third step was dispersed in N-methyl pyrrolidone and subjected to ultrasonic treatment for 2 hours. Graphene was thus obtained.

Comparative Example 1

Graphene Prepared by Oxidation-Reduction Preparation in the Solution-Phase

First, 1.2 g of potassium nitrate was weighed and added to 46 ml of 96 wt % concentrated sulfuric acid, and 1.0 g of graphite was added and mixed uniformly. Then, 6.0 g of potassium permanganate was slowly added with stirring. The mixture was heated to 40° C. and continuously stirred for 6 hours. Then 80 ml of water was slowly added dropwise. The system was heated to a temperature of 70° C. and stirred for 30 minutes. 200 ml of deionized water and 6 ml of 30 wt % hydrogen peroxide solution are added and stirred for 5 minutes. The reaction product was washed with deionized water for several times until the pH of the system reached 5. Graphite oxide was thus obtained.

Secondly, the resulting graphite oxide was subjected to ultrasonic treatment in an aqueous solution for 30 minutes to obtain a graphene oxide sol. hydrazine hydrate was added to the sol obtained with the ratio of hydrazine hydrate to graphene oxide of 1:1 by mass. The resulting mixture was mixed uniformly and placed in an oven at 80° C. for 12 hours. The resulting product was subjected to centrifugation, washing and drying. Graphene was thus obtained.

Comparative Example 2

Graphene Prepared by Oxidation-Reduction Preparation in the Solution-Phase

First, 1.0 g of graphite was weighed and added to 20 ml of 96 wt % concentrated sulfuric acid, and 3.0 g of potassium perchlorate was added and the mixture was allowed to react in an ice bath at 0° C. for 2 hours under stirring. The system was heated to a temperature of 40° C. and the reaction was continued for 12 hours under stirring. 200 ml of deionized water was then added and the system was heated to a temperature of 90° C. Stirring was continued for another 30 minutes and the system was cooled to room temperature. The reaction product was washed with deionized water for several times until the pH of the system reached 5. Graphite oxide was thus obtained.

Secondly, the resulting graphite oxide was subjected to ultrasonic treatment in an aqueous solution for 1 hour to obtain a graphene oxide sol. hydrazine hydrate was added to the obtained sol with the ration of hydrazine hydrate to graphene oxide of 1:1 by mass. The resulting mixture was mixed uniformly and placed in an oven at 80° C. for 12 hours. The resulting product was subjected to centrifugation, washing and drying. Graphene was thus obtained.

Characterization and Performance Tests

Structural characterization was carried out for the graphene prepared in Example 1, the graphene flake had a thickness of 2-3 nm and a size distribution between 1 and 50 microns.

Figure 2:
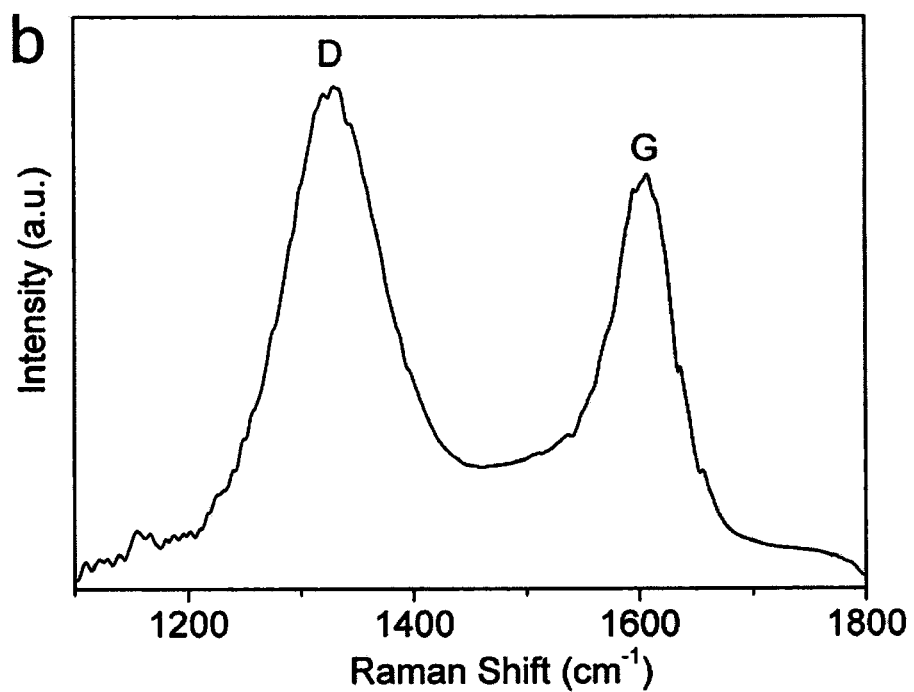
FIG. 2 shows the Raman spectrum of graphene prepared in Comparative Example 1 of the present invention.

Raman spectroscopy tests were carried out for the graphenes prepared in Example 1 and Comparative Example 1, and the results were shown in FIGS. 1 and 2. As can be seen from the results shown in FIGS. 1 and 2, the structural defects (marked as D-peak) in the graphene prepared in Example 1 were significantly less than those in the graphene prepared by oxidation-reduction preparation in the solution-phase. The ratio of carbon to oxygen atoms in the graphene prepared in Example 1 was 21.2 determined by X-ray photoelectron spectroscopy (XPS), while the ratio of carbon to oxygen atoms in the graphene oxide, before reduction, in Comparative Example 1 was 1.2 and the ratio of carbon to oxygen atoms in the graphene, after reduction, in Comparative Example 1 was merely 10.1. That is, the degree of oxidation of graphene according to the preparation method provided by the present Example was significantly lower than that according to oxidation-reduction preparation in the solution-phase. So was the degree of damage to the structure of the grapheme. In addition, the graphene prepared in Example 1 had a conductivity of 1000 S/cm, while that prepared in Comparative Example 1 had a conductivity of 5 S/cm. That is, the graphene prepared in the present Example had conductivity much higher than that prepared according to oxidation-reduction preparation in the solution-phase.

Structural and performance characterizations were carried out for the graphenes prepared in Examples 2-33 and Comparative Example 2, and the results were shown in Table 1:

TABLE 1

Results of performance characterizations of the graphenes prepared in Examples 2-33 and Comparative Example 2

| No. | yield (%) | ratio of carbon to oxygen atoms | conductivity S/cm |
| --- | --- | --- | --- |
| Example 2 | 93 | 19.8 | 1000 |
| Example 3 | 95 | 27.6 | 1200 |
| Example 4 | 95 | 21.2 | 900 |
| Example 5 | 90 | 24 | 1000 |
| Example 6 | 95 | 18.2 | 500 |
| Example 7 | 96 | 20 | 800 |
| Example 8 | 95 | 17.2 | 500 |
| Example 9 | 88 | 19 | 750 |
| Example 10 | 93 | 18.5 | 600 |
| Example 11 | 94 | 23.4 | 900 |
| Example 12 | 95 | 26 | 1000 |
| Example 13 | 96 | 16.5 | 500 |
| Example 14 | 95 | 17.2 | 600 |
| Example 15 | 92 | 19 | 500 |
| Example 16 | 96 | 19.8 | 700 |
| Example 17 | 90 | 22.3 | 900 |
| Example 18 | 93 | 19.8 | 750 |
| Example 19 | 96 | 17.2 | 500 |
| Example 20 | 92 | 19 | 700 |
| Example 21 | 95 | 21.2 | 800 |
| Example 22 | 92 | 21 | 1000 |
| Example 23 | 93 | 20.3 | 800 |
| Example 24 | 95 | 22.2 | 1200 |
| Example 25 | 92 | 17.5 | 500 |
| Example 26 | 95 | 19.8 | 700 |
| Example 27 | 95 | 21.7 | 800 |
| Example 28 | 88 | 21.2 | 1000 |
| Example 29 | 89 | 15.9 | 500 |
| Example 30 | 90 | 17.5 | 550 |
| Example 31 | 90 | 19 | 750 |
| Example 32 | 92 | 21.2 | 900 |
| Example 33 | 93 | 20.3 | 800 |
| Comparative Example 2 | 95 | 1.8 (before reduction) 10.8 (after reduction) | 10 |

The present invention provides a method for preparing high-quality graphene with efficiency. Despite the description of the specific embodiments, persons skilled in the art could apparently carry out the method for preparing grapheme according to the present invention while make suitable changes or appropriate modifications and combinations so as to achieve the present invention, without departing from the contents, spirit and scope of the present invention. It should be particularly noted, all the equivalent substitutions and modifications are obvious to those skilled in the art, which are constructed as being included in the spirit, content and scope of the present invention.

What is claimed is:

1. A method for preparing graphene, consisting of the following steps:
   (i) reacting graphite in an acid solution in which an oxidant is present,
   (ii) washing the product obtained in step (i) with water to neutral, and
   (iii) subjecting the product obtained in step (ii) to a step of stripping selected from mechanical grinding and/or ultrasonic treatment, thereby resulting in formation of a graphene,
   wherein the graphene has a ratio of carbon to oxygen atoms of greater than 10, and the ratio of graphite:acid:oxidant:solvent is 1:0.1-50:0.1-50:0.1-100 by mass.

2. The method according to claim 1, wherein the graphene has a ratio of carbon to oxygen atoms of greater than 14.

3. The method according to claim 1, wherein the acid in the acid solution comprises one or more selected from the group consisting of nitric acid, sulfuric acid, perchloric acid, hypochlorous acid, nitrous acid, chlorosulfonic acid, acetic acid, and oxalic acid.

4. The method according to claim 1, wherein the oxidant in the acid solution comprises one or more selected from the group consisting of nitric acid, sulfuric acid, perchloric acid, hydrochloric acid, hypochlorous acid, nitrous acid, chlorosulfonic acid, dichromates, perchlorates, chlorates, hypochlorites, persulfates, hydrogen peroxide, and peroxides.

5. The method according to claim 1, wherein solvent in the acid solution comprises one or more selected from the group consisting of ethanol, carbon tetrachloride, benzene, water, methanol, acetone, formaldehyde, acetaldehyde, and acetic acid.

6. The method according to claim 1, wherein the reaction of step (i) is carried out at a temperature of 0-90° C.

7. The method according to claim 1, wherein the reaction of step (i) is carried out for 1 minute to 10 hours.

8. The method according to claim 1, wherein the graphene has a ratio of carbon to oxygen atoms of greater than 16.

9. The method according to claim 1, wherein the graphene has a ratio of carbon to oxygen atoms of greater than 20.

* * * * *